Figure 1:
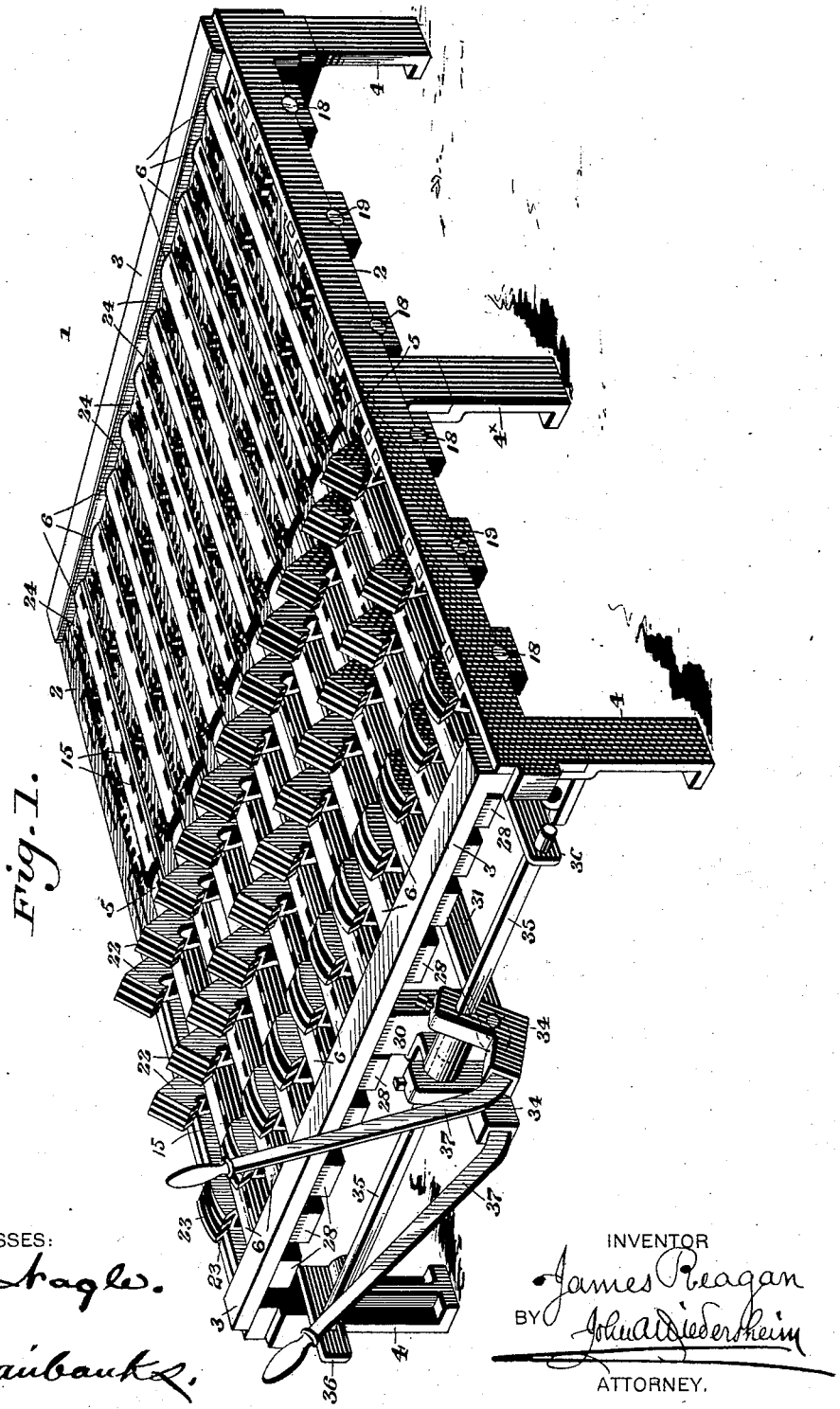

(No Model.) 6 Sheets—Sheet 1.

J. REAGAN.
GRATE.

No. 566,093. Patented Aug. 18, 1896.

WITNESSES:
INVENTOR
James Reagan
BY
ATTORNEY.

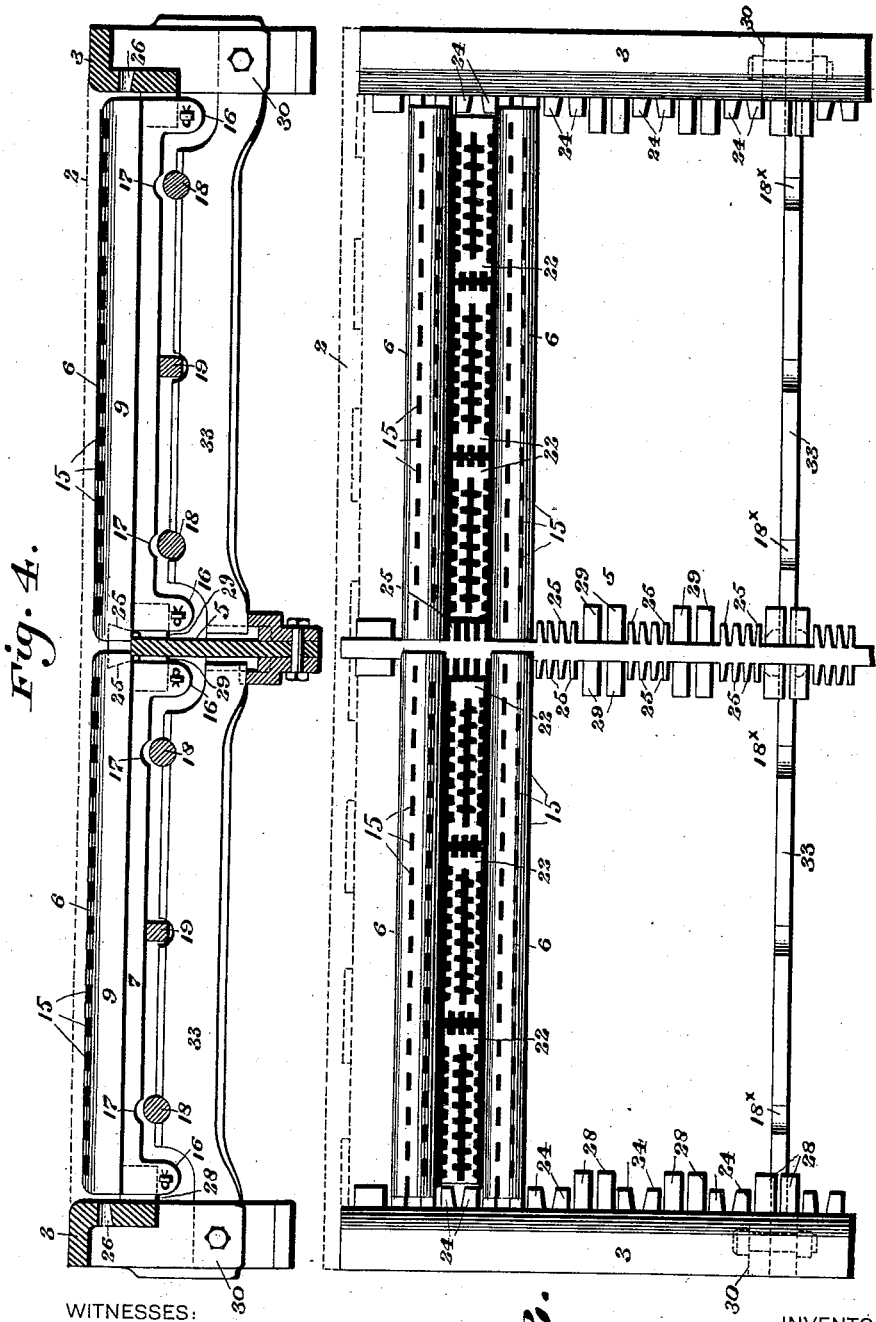

(No Model.)  6 Sheets—Sheet 3.
J. REAGAN.
GRATE.
No. 566,093.  Patented Aug. 18, 1896.
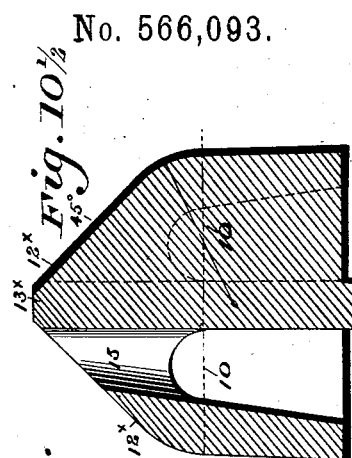
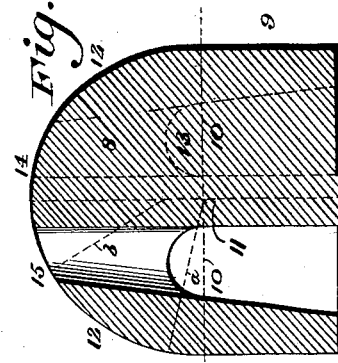
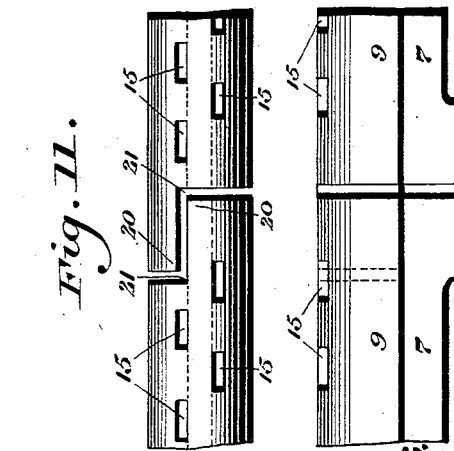
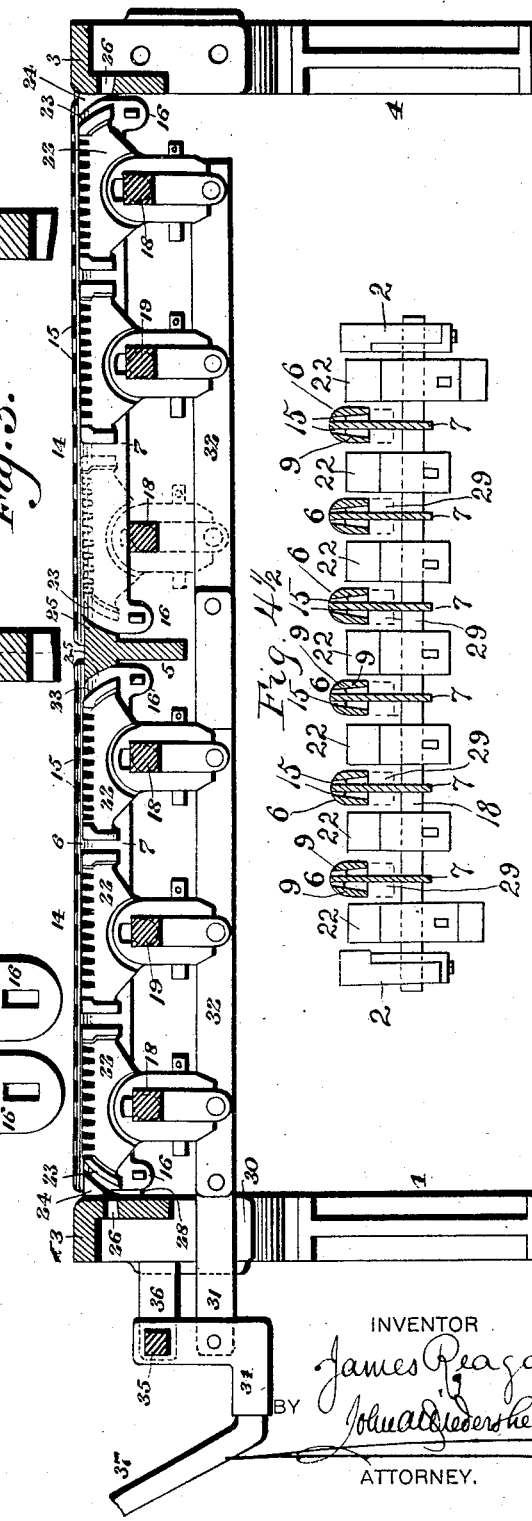
WITNESSES:
INVENTOR
James Reagan
BY
ATTORNEY.

(No Model.)   6 Sheets—Sheet 4.
J. REAGAN.
GRATE.
No. 566,093. Patented Aug. 18, 1896.
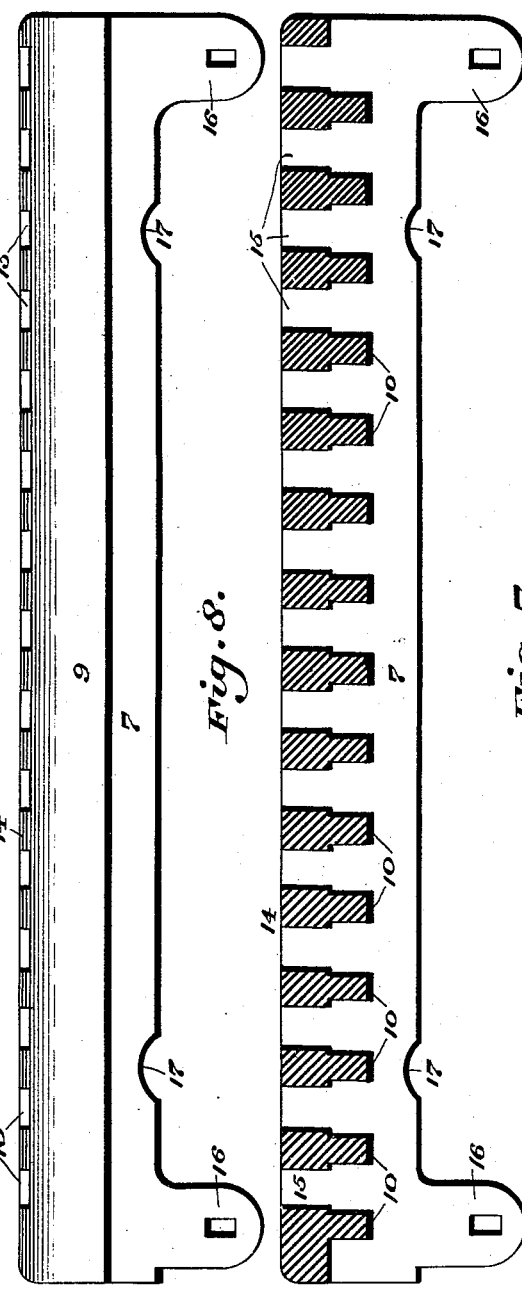
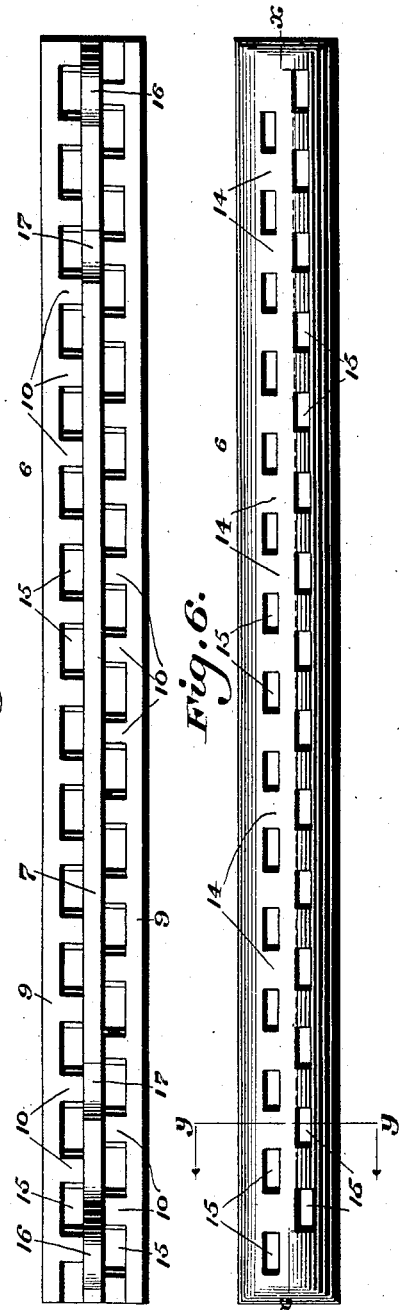
WITNESSES:
INVENTOR
James Reagan
BY
ATTORNEY.

(No Model.) 6 Sheets—Sheet 5.
J. REAGAN.
GRATE.
No. 566,093. Patented Aug. 18, 1896.
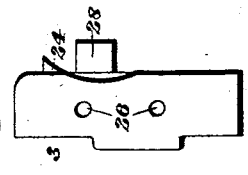
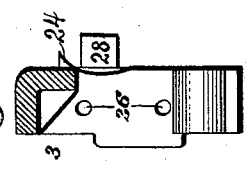
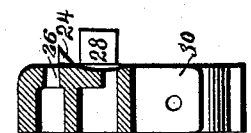
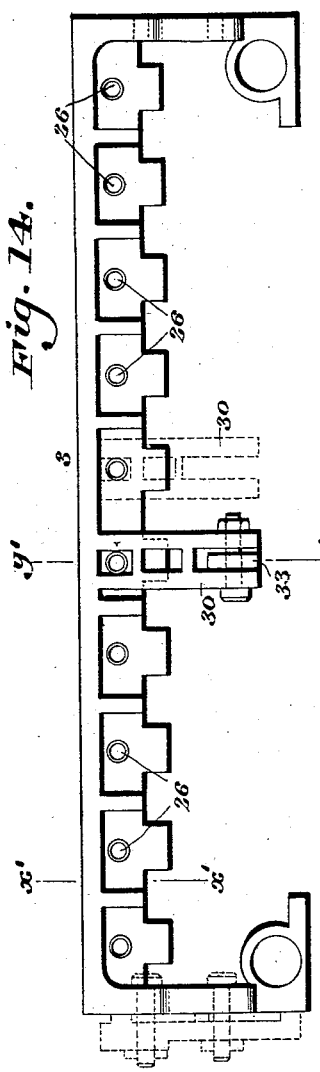
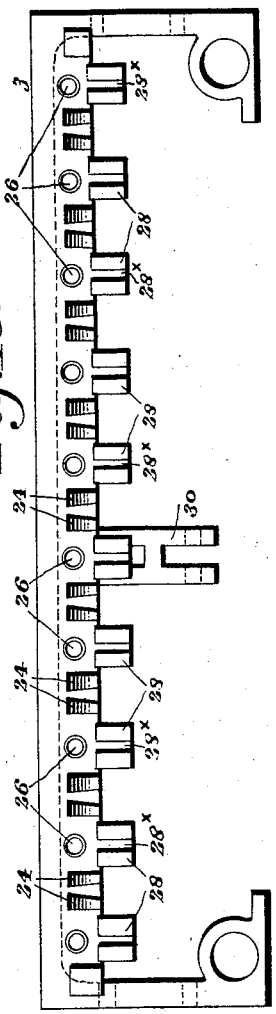
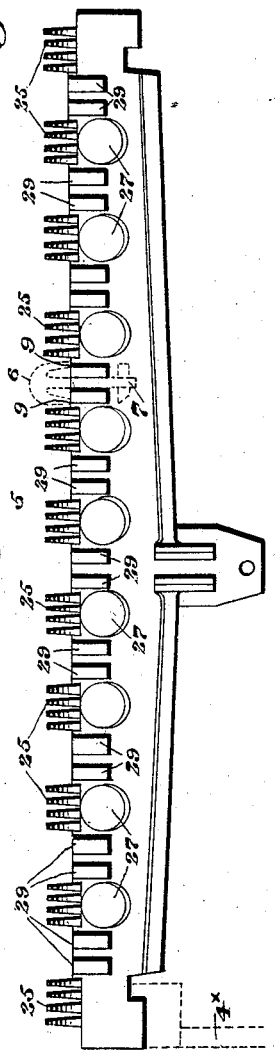
WITNESSES:
INVENTOR
James Reagan
BY
ATTORNEY.

(No Model.)  6 Sheets—Sheet 6.
J. REAGAN.
GRATE.
No. 566,093.  Patented Aug. 18, 1896.
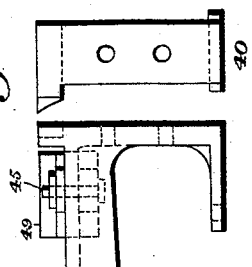
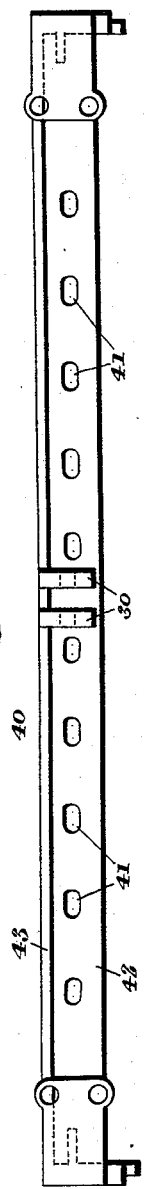
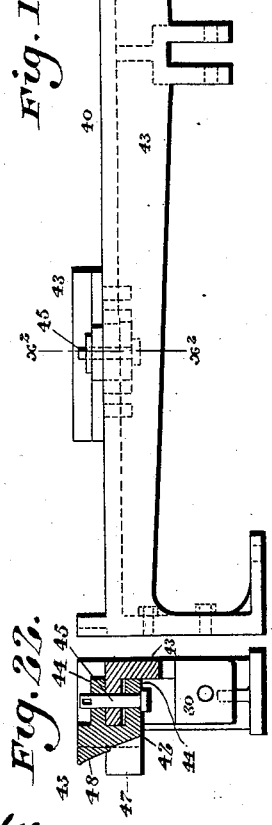
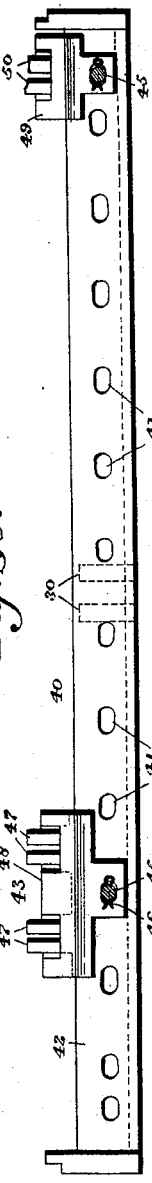
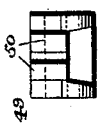
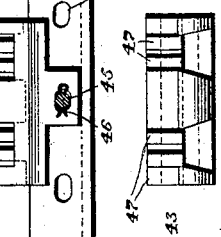
WITNESSES:
INVENTOR
James Reagan
BY
ATTORNEY.

UNITED STATES PATENT OFFICE.

JAMES REAGAN, OF PHILADELPHIA, PENNSYLVANIA.

GRATE.

SPECIFICATION forming part of Letters Patent No. 566,093, dated August 18, 1896.

Application filed February 28, 1896. Serial No. 581,114. (No model.)

*To all whom it may concern:*

Be it known that I, JAMES REAGAN, a citizen of the United States, residing in the city and county of Philadelphia, State of Pennsylvania, have invented a new and useful Improvement in Grates, which improvement is fully set forth in the following specification and accompanying drawings.

My invention relates to grates; and it consists of a novel construction and assemblage of a series of longitudinal apertured grate-bars and a series of movable choppers interposed therebetween, provision being made for rocking said choppers in unison and means being also provided for imparting an upward and longitudinal movement to the longitudinal bars interposed between said choppers when desired.

It also consists of a novel construction of grate-bar which can be used as a stationary bar, if desired, the same having a longitudinally-depending strengthening-web and depending wings on either side thereof, said bar further having transverse ribs intermediate said wings and web and having also its upper portion or crown struck from a shorter radius than the sides of said bar.

It also consists of a novel construction of the front and rear bearing-bars and their adjuncts which serve to greatly assist in cleaning the fire.

It further consists of novel details of construction, all as will be hereinafter set forth, and specifically pointed out in the claims.

Figure 1 represents a perspective view of a grate embodying my invention, the rear portion of said figure showing the choppers in normal position and the forward portion of said figure showing said choppers as rocked in the act of dumping the fire. Fig. 2 represents a plan view of Fig. 1, showing a pair of longitudinal grate-bars embodying my invention and their adjuncts and the choppers interposed between, the other bars and choppers being removed for the sake of clearness of illustration. Fig. 3 represents a vertical longitudinal section through the grate seen in Figs. 1 and 2, showing especially the choppers and their adjuncts and the means for actuating the same. Fig. 4 represents a vertical longitudinal section through the grate, the section being taken on a different line from Fig. 3. Fig. $4\frac{1}{2}$ represents a cross-section of the fuel-bearing surface, showing the choppers and side bearing-bars in end elevation. Fig. 5 represents a side elevation of a longitudinal grate-bar to be hereinafter referred to. Fig. 6 represents a top plan view of the grate-bar seen in Fig. 5. Fig. 7 represents a bottom plan view of the same. Fig. 8 represents a section on line $x\,x$, Fig. 6. Fig. 9 represents an end elevation of Fig. 5. Fig. 10 represents, on an enlarged scale, a transverse section on line $y\,y$, Fig. 6, the lower portion of the longitudinal web being broken away. Fig. $10\frac{1}{2}$ represents a transverse section of a modified form of grate-bar to be hereinafter referred to. Figs. 11 and 12 represent plan and side elevations, respectively, of an end portion of a modified form of grate seen in Figs. 5 to 10, inclusive, to be hereinafter referred to. Fig. 13 represents a side elevation of the transverse bridge-bar employed. Fig. 14 represents a vertical elevation of the outer portion of the front and back bearing-bar, which serves to support the longitudinal grate-bar seen in Figs. 5 to 10, inclusive. Fig. 15 represents a vertical elevation of the bar seen in Fig. 14 viewed from the interior. Fig. 16 represents an end view of the bar seen in Figs. 14 and 15. Fig. 17 represents a section on line $x'\,x'$, Fig. 14. Fig. 18 represents a section on line $y'\,y'$, Fig. 14. Fig. 19 represents a side elevation of a modified form of front and rear bearing-bars, showing the preferred construction employed when it is desired to make provision for extreme expansion and contraction of the grate. Fig. 20 represents a top plan view of Fig. 19, showing one of a series of removable supporting-blocks or carriers employed placed in position. Fig. 21 represents a bottom plan view of Fig. 19. Fig. 22 represents a section on line $x^2\,x^2$, Fig. 19. Fig. 23 represents an end view of Fig. 19. Figs. 24 and 25 represent front and end elevations, respectively, of the removable supporting-blocks employed to be hereinafter referred to. Fig. 26 represents in detached position a plan view of the end-supporting blocks employed.

Similar figures of reference indicate corresponding parts in the several views.

Referring to the drawings, 1 designates the grate, the same being of rectangular or other shape and consisting of the side bearing-bars 2 and the front and rear bearing-bars 3, which are suitably held together and are supported upon the corner-feet 4 and the intermediate feet $4^\times$, although it is evident that other supporting devices may be employed, if desired.

5 designates a substantially centrally located transverse bridge-bar, which is supported upon the intermediate feet $4^\times$, as will be evident from the left-hand portion of Fig. 13.

6 designates a longitudinal grate-bar employed, to which especial attention is directed, the detailed construction of said grate-bar being apparent from Figs. 5 to 10, inclusive.

7 designates a longitudinally-extending web which depends from the top or body portion 8 of said bar 6.

9 designates depending wings which are located on each side of said web 7, between which latter and said wings extend the transverse ribs 10, which serve in conjunction with said central web and said wings to produce a grate-bar which is effective and durable and is not easily warped or damaged from use, the relative position of the web, ribs, and wings being apparent from Figs. 7 and 10.

11 designates the center of the radius, by means of which the upper curved surfaces 12 of the bar are struck or laid out, said point 11 being a short distance below the junction of the web 7 with the body portion 8 of said bar. The upper curved surfaces 12 of the bar unite with the top portion or crown 14 of the same, said crown being struck from the center 13, which latter is a short distance above the center 11, as will be understood from Fig. 10, the respective radii being indicated at $a$ and $b$, whereby it will be seen that the upper surface of the bar is not of uniform semicircular contour, but is raised higher at its crown or apex and has a sharper curvature by reason of its arc being struck from a different center, thus making the upper surface or crown 14 of the bar somewhat of an elliptical form, whereby all flat surfaces are avoided and ashes are prevented from accumulating on the top of said bar.

In Fig. $10\frac{1}{2}$ the upper portions or sides of the bar $12^\times$ are inclined at substantially an angle of forty-five degrees to the vertical, said sides meeting the top $13^\times$, the other portions of the bar remaining as already described with respect to Fig. 10, the bar seen in Fig. $10\frac{1}{2}$ being especially adapted for certain varieties of coal.

15 designates apertures or slots which are arranged in staggered order throughout the length of the bar, as will be best understood from Fig. 6, it being noted that said slots are preferably tapering, being widest at their lower portion and narrowest at their top or junction with the crown 14, thereby forming a species of nozzles and serving to concentrate the currents of air upon the crown of the bar it being apparent that said currents are thus directed high up and over the top of the bar and are thoroughly and effectively distributed throughout every portion of the fire, it being further noted that the air passing through the bar is effectively heated to a high degree before it passes up through the top of the fire.

16 designates lugs which depend from the extremities of the bar and are provided with slots therein, through which keys, pins, or rings may be inserted for the purpose of holding the bar in position, as will be evident from Fig. 4.

17 designates recesses in the edge of the web 7, which are for the purpose of clearing the shafts 18, upon which the choppers 22 are mounted, it being noted that said shafts are cylindrical at this point, near the ends of the bar 6, as indicated in Fig. 4, while the intermediate shafts 19 are squared and remain in contact with the under edge of the web 7 of said bar, whereby when said shafts 19 are rocked the bars 6 will be given an upward and longitudinal movement, as will be hereinafter explained.

I may make the ends of the bars square, as shown in Figs. 6 and 7, or, if desired, I may recess the abutting ends, as shown in Figs. 11 and 12, the projecting portions 20 of one end entering the recessed portions 21 of the adjacent bar.

The choppers 22 are constructed and operated in accordance with a prior patent granted to me, and do not require a detailed description in the present instance, although it will be noted that the choppers which are mounted nearest to the bridge-bar 5 and to the front and back bars 3 have their adjacent edges 23 arc-shaped, in order to coact with the arc-shaped ledges 24 of said front and back bars and the curved or arc-shaped ledges 25 of the transverse bridge-bar 5, as will be evident from Fig. 3.

26 designates holes which are located in the front and rear bearing-bars 3 at intervals throughout their lengths, said holes being for the purpose of allowing air to freely circulate throughout every portion of the grate, the bridge-bar 5 being also provided with similar holes or ports 27, which have a similar function.

28 designates ledges which are mounted upon the inner portion of the front and rear bars and which, in conjunction with similar ledges 29 on either side of the bridge-bar 5, serve to support the longitudinally-extending grate-bars 6, the latter resting thereupon, as indicated in dotted lines in Fig. 13, and being held in position by keys, pins, or suitable devices, as has already been described, while the engagement of the web 7 with the recessed portion $28^\times$ of each ledge prevents each of said bars 6 from lateral shifting.

30 designates guides or lugs which depend from the front and rear bearing-bars 3, through which one end of the bearing-bars 33 passes, said bars supporting the shafts 18 and 9, the other end of said bars being suitably supported by means of brackets or similar devices attached to the bridge-bar, as indicated in Fig. 4.

31 designates a link which is suitably attached to the connecting-rods 32, the latter having connections projecting therefrom, upon which the shakers or choppers 22 are mounted, as will be evident from Fig. 3.

The specific manner of mounting and actuating the choppers forms the subject of prior patents granted to me, and therefore requires no further description in the present instance, it being apparent, however, that any reciprocation of the connecting-rods 32 will cause a rocking or oscillating movement to be imparted to the choppers, as is evident from Fig. 1, in which the forward choppers are shown in tilted position, while the choppers in the rear portion of the grate are in their normal position.

34 designates an elbow-lever which is mounted upon the shaft 35, which latter is supported in brackets 36, attached to suitable portions of the grate, said elbow-lever being actuated by any suitable means, as the levers 37, which, if desired, may be made removable, so as to be out of the way when not in use.

The operation is as follows: The parts are best seen in their normal or assembled position in Figs. 1 and 3, it being noted that the crowns of the bars 6, when the choppers 22 are in normal position, are slightly above said choppers, whereby it will be seen that the heated air which passes out of the ports 15 of the bars 6 will, by reason of their location and staggered arrangement, be directed over every portion of the choppers, as well as every portion of the grate-bars 6, and will thus tend to always direct a fresh supply of oxygen not only to the fuel located upon the grate-bars 6, but also through and over the fuel which may be supported upon the choppers 22. When it is desired to shake the fire, a slight reciprocation of the links 31 will impart the desired agitation to the choppers 22, and the act of raking the fire will be quickly and effectively accomplished, and when it is desired to dump the fire it can be accomplished by rocking the choppers into the position seen in the front or left-hand portion of Fig. 1. When it is desired for any reason to replace one of the bars 6, it is only necessary to remove the keys or devices which hold the same in position, as shown in Figs. 3 and 4, after which the bars can be instantly removed by simply lifting the same from the grate, and readily replaced, without necessitating the employment of skilled labor.

I now desire to call attention to another feature of great importance and to which I find much of the effectiveness of the present grate is due. It will be noted, on reference to Fig. 4, that the longitudinally-extending webs of each of the grates 6 are recessed near their ends, and that the shafts 18 in each instance are rounded adjacent thereto, so as to turn readily in their bearings $18^\times$ in the bar 33, while the intermediate shaft 19 is square at its point of contact with said depending web 7, whereupon it will be seen that the reciprocation of the connecting-rods 32 will cause the said shafts 19 to turn in their bearings, and the upper shoulders or corners of said shafts will contact with the web 7 of said bars and will raise the same and impart a longitudinal as well as a slight up-and-down movement to each of said bars 6, according to whichever direction the said shafts 18 and 19 are rocked, or, in other words, a compound movement through horizontal planes, it being of course understood that while this movement of the bars 6 is limited by the bridge-bar 5 and the adjacent portion of the front and rear bars 3 sufficient movement is permitted to be imparted to effectively clean each of said bars 6, the upward movement being limited by means of the contact of the holding device, which passes through the lugs 16 with the ledges 28 and 29, upon which the aforesaid bars 6 are supported.

It will be seen from the foregoing that the present grate is especially adapted for any kind of furnace, stationary, locomotive, marine, or other make, and the same can be readily assembled and placed in position without necessitating the employment of skilled labor, and that when any portion of said grate becomes damaged for any reason access can be readily had thereto without dismantling the grate to any extent, it being further apparent that every part of the grate is open to currents of air, so that a free supply of oxygen is admitted to every portion of the fire, attention being further directed to the fact that the air which enters the ports 15 is heated to a high degree and concentrated before being discharged on the fire, as will be apparent from Figs. 10 and 10½, emphasis being especially laid on the fact that by reason of the curved outer upper surface or crown of the bars 6 the currents of heated air pass upwardly over the same and commingle with the heated air-currents which pass through the ports 15, thereby rendering the operation of the grate exceedingly effective.

In some instances it may be desirable to provide for increased expansion of the several sections of the grate relative to each other and to provide means whereby, in case the end bearing-bars 3 (seen in Fig. 3) should become warped to such an extent that the ledges 24 should interfere with the movement of the adjacent faces of the choppers, it may be desirable to replace or interchange the same, and to this end I construct said end bearing-bars 3 preferably as seen in Figs. 19 to 23, inclusive, 40 designating the body portion of said bar, which is of angular shape and has the laterally-extending member 42 and the depending member 43, as will be understood from Fig. 22. The said lateral member 42 is provided with holes 41, arranged in longitudinal order, as will be understood from Figs. 20 and 21, through which passes the bolt or other fastening means 45, the same passing through the lugs 44 of the blocks 43, as will be understood from Fig. 20, and said bolt being held by means of the split pin or other device 46.

47 designates ledges projecting from said blocks, which are adapted to support the stationary bars 6, said ledges 47 corresponding to the ledges 29, while the curved ledges 48 have the same function as the similarly-located ledges 24 and 25. (Seen in Fig. 2.)

The construction of the end supporting-block employed will be apparent from the right-hand portion of Figs. 19 and 20, the same being designated as 49 and having lugs engaging the member 42, the longitudinal bars 6 being supported upon the ledges 50, as will be evident from Fig. 26. It will be apparent that the blocks 43 and 49 can be readily removed and replaced in case of injury or warping from excessive heat or from other causes, said end bearing-bars 40 being provided with depending lugs 30, by which the bearing-bars 23 are supported, as already described, the extremities of said bars being also provided with feet, which are supported in any suitable manner.

Having thus described my invention, what I claim as new, and desire to secure by Letters Patent, is—

1. A grate-bar consisting of a body portion, a substantially central, longitudinally-extending web depending therefrom, wings depending from the outer portion of said body on either side of said web, the top of said bar being rounded and having its crown of sharper curvature than the adjacent portion, said bar being further provided with ports arranged in staggered position, and staggered ribs extending from each of said wings to said web, substantially as described.

2. A grate-bar consisting of a body portion, a longitudinal web depending therefrom, wings depending from said body portion on either side of said web, staggered transverse ribs common to said web and wings, tapering ports extending through said body portion and arranged in staggered order, the crown of said bar being arc-shaped and having a sharper curvature at its apex than at its adjacent portions, said web being further provided with depending lugs for attachment to any desired point, substantially as described.

3. A grate-bar having a suitable body portion with a longitudinal web depending therefrom, wings also depending from said body on either side of said web, staggered transverse ribs extending from the latter to said wings ports arranged in staggered order and extending through said body portion, the crown of said grate having a greater curvature than the adjacent portion, lugs depending from the ends of said grate for attaching the same to any desired point, and the ends of said grate-bar being recessed or stepped so as to enable said bars to be readily cleaned, substantially as described.

4. In a grate, suitable supporting devices, a series of longitudinally-extending bars adapted to rest thereupon, and provided with a depending web and wings and staggered transverse ribs and ports arranged substantially as shown, the crowns of said bars being of sharp curvature relative to the adjacent surfaces, choppers interposed between adjacent bars and having their surfaces normally below said crowns, and means for actuating said choppers, substantially as described.

5. In a grate, a series of longitudinally-extending apertured grate-bars, having a web depending therefrom, wings depending from said bars on either side of said web, ribs common to said wings and web, front and rear supporting-bars, a bridge-bar intermediate the latter, choppers intermediate said grate-bars, and transverse shafts upon which said choppers are mounted, in combination with means for imparting to said apertured grate-bars a compound movement through horizontal planes, substantially as described.

6. In a grate, front and rear bearing-bars, a bridge-bar, ledges thereupon, longitudinally-extending grates supported upon said ledges, each of said grates having a depending web, wings on either side of the latter, and transverse ribs common to said wings and web, choppers interposed between said grates, arc-shaped ledges on said front and rear bars and on said bridge-bar adjacent the choppers, the adjacent surfaces of the latter being also arc-shaped so as to coact with said choppers, and means for actuating the latter and said longitudinal grates in unison, substantially as described.

7. In a grate, a series of longitudinally-extending bars having a raised crown, and staggered tapering ports extending therethrough, a longitudinally-extending web and wings depending from said bars, ribs intermediate said wings and web, choppers interposed between said bars, and means for actuating said bars and choppers in unison, substantially as described.

8. A grate consisting of front and rear bearing-bars, a bridge-bar intermediate the latter, longitudinally-extending bars supported on said bearing and bridge bars, and having raised curved crowns and staggered ports therethrough, choppers suitably supported intermediate said bars, and having their tops normally below the latter, and means for imparting to said longitudinally-extending bars, a compound movement through horizontal planes, simultaneously with the oscillation of said choppers, substantially as described.

9. A grate-bar consisting of the body portion, a longitudinally-extending web and wings depending therefrom, staggered transverse ribs common to said web and wings, and lugs attached to the extremities of said web, the crown of said bar being curved for a portion of its surface, and being inclined for the rest of its surface, substantially as described.

10. A grate provided with front and rear bearing-bars, a bridge-bar intermediate the same, longitudinally-extending apertured grate-bars supported upon said former bars, choppers located intermediate said grate-bars, and means for operating said choppers, said bridge-bar and bearing-bars having arc-shaped ledges thereupon which are adapted to coact with the faces of the adjacent choppers, substantially as described.

11. A grate having front and rear supporting-bars, and a central bridge-bar, ledges attached to the latter and to said front and rear bars, and adapted to support longitudinally-extending bars and choppers interposed therebetween, in combination with the adjacent recessed ledges having their under portions arc-shaped, and adapted to coact with the faces of the adjacent choppers, substantially as described.

12. A furnace-grate consisting of a suitable body portion, a longitudinal web depending therefrom, wings depending from said body portion on either side of said web, a portion of the upper surface of said grate being curved on an arc struck from a point below the junction of said web and body, while the crown of said grate is curved on an arc struck from a point at or about the junction of said web and body, staggered transverse ribs intermediate said wings and web, and staggered tapering ports passing through said body, substantially as described.

13. In a grate, front and rear bearing-bars, an intermediate bridge-bar, a series of longitudinally-extending curved, perforated grate-bars suitably supported, and a series of choppers interposed between said bars, and having their faces normally below the crown of the latter, in combination with means for actuating said grate-bars and choppers in unison, substantially as described.

14. In a grate, a series of longitudinally-extending grate-bars having a web depending therefrom, in combination with shafts having choppers mounted thereon, intermediate said bars, certain of said shafts being out of contact with said web, while another shaft is square, and adapted to contact with said web, and impart thereto a compound movement through horizontal planes when said shaft is rocked, substantially as described.

15. In a grate, front and rear bearing-bars, a bridge-bar, and a series of longitudinally-extending, perforated, curved grate-bars supported thereupon, in combination with choppers interposed between said grate-bars, and having their upper surfaces normally below the crown of said bars and means for imparting to the latter a compound movement through horizontal planes, substantially as described.

16. In a grate, front and rear bearing-bars, side bearing-bars, longitudinal bars and choppers suitably supported thereupon, in combination with movable supporting blocks or carriers having ledges thereon for the support of said longitudinal bars, and curved faces or ledges adapted to coact with the adjacent faces of the choppers, substantially as described.

17. As an article of manufacture, the herein-described bridge-bar, the same having a suitable body portion, supporting-ledges on either side thereof adapted to assist in sustaining longitudinally-extending grate-bars, and other ledges having curved or arc-shaped faces alternately arranged on said body portion with respect to said supporting-ledges, substantially as and for the purpose set forth.

18. In a furnace-grate of the character described, supporting-blocks having a suitable body portion, with lugs projecting therefrom adapted to be attached to bearing-bars, supporting-ledges projecting from said body portion opposite to said lugs and adapted to sustain longitudinally-extending grate-bars, said blocks having also curved ledges interposed between said supporting-ledges, said curved ledges being adapted to coact with the faces of adjacent choppers, substantially as described.

JAMES REAGAN.

Witnesses:
ISAAC R. OAKFORD,
M. DES GEORGES.